(12) United States Patent
Eversole

(10) Patent No.: US 10,125,824 B2
(45) Date of Patent: Nov. 13, 2018

(54) MULTI-PIECE DRIVESHAFT ASSEMBLY

(71) Applicant: Dana Automotive Systems Group, LLC, Maumee, OH (US)

(72) Inventor: Philip A. Eversole, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 98 days.

(21) Appl. No.: 15/307,633

(22) PCT Filed: May 5, 2015

(86) PCT No.: PCT/US2015/029166
§ 371 (c)(1),
(2) Date: Oct. 28, 2016

(87) PCT Pub. No.: WO2015/171557
PCT Pub. Date: Nov. 12, 2015

(65) Prior Publication Data
US 2017/0051793 A1   Feb. 23, 2017

Related U.S. Application Data

(60) Provisional application No. 61/988,447, filed on May 5, 2014.

(51) Int. Cl.
F16C 3/02      (2006.01)
F16D 3/38      (2006.01)
F16C 27/06     (2006.01)

(52) U.S. Cl.
CPC ............ F16D 3/387 (2013.01); F16C 27/066 (2013.01); F16C 2326/06 (2013.01)

(58) Field of Classification Search
CPC ..... F16C 27/066; F16C 2326/06; F16D 3/387

USPC .................... 464/134, 178; 180/382
See application file for complete search history.

(56) References Cited

U.S. PATENT DOCUMENTS

| | | | |
|---|---|---|---|
| 3,122,901 A * | 3/1964 | Thompson | A01B 71/08 464/178 X |
| 3,420,327 A | 1/1969 | Nallinger et al. | |
| 4,192,153 A * | 3/1980 | Fisher | F16D 3/387 464/134 |
| 4,527,978 A | 7/1985 | Zackrisson | |

(Continued)

FOREIGN PATENT DOCUMENTS

| | | |
|---|---|---|
| DE | 4008538 A1 | 9/1990 |
| DE | 4224201 A1 | 1/1994 |

(Continued)

OTHER PUBLICATIONS

International Search Report and Written Opinion for Application No. PCT/US15/29166, dated Nov. 4, 2015, issued by the European Patent Office.

*Primary Examiner* — Greg Binda
(74) *Attorney, Agent, or Firm* — Marshall & Melhorn, LLC

(57) ABSTRACT

A multi-piece driveshaft assembly (10) includes a driveshaft assembly (12). The driveshaft assembly comprises a yoke (32) provided at an end thereof. A universal joint (16) is attached to the yoke. A coupling shaft assembly (14) includes a tube yoke (32) and tube (44). The tube yoke is attached near an end thereof to the universal joint and at or near an opposite end thereof to the tube. A rotational support member (84) is attached to and surrounds a portion of an outer surface of the tube yoke.

16 Claims, 6 Drawing Sheets

(56) References Cited

U.S. PATENT DOCUMENTS

| | | |
|---|---|---|
| 4,912,299 A | 3/1990 | Oros et al. |
| 5,342,243 A | 8/1994 | Seksaria et al. |
| 5,672,286 A | 9/1997 | Seeds |
| 6,001,018 A | 12/1999 | Breese |
| 6,015,350 A | 1/2000 | Breese |
| 6,105,849 A | 8/2000 | Mochizuki et al. |
| 6,319,134 B1 | 11/2001 | Menosky et al. |
| 6,364,780 B1 | 4/2002 | Amborn et al. |
| 6,367,680 B1 | 4/2002 | Duggan |
| 6,422,947 B1 * | 7/2002 | Kelly .................... B60K 17/24 |
| | | 464/178 |
| 6,554,714 B2 | 4/2003 | Kurecka et al. |
| 6,792,660 B1 | 9/2004 | Breese |
| 6,855,061 B2 | 2/2005 | Simboli |
| 8,409,019 B2 | 4/2013 | Ogawa et al. |
| 8,628,250 B2 | 1/2014 | Oinuma et al. |
| 9,714,682 B2 * | 7/2017 | Erlmann .................... F16D 3/26 |
| 2003/0125118 A1 | 7/2003 | Raghavan et al. |
| 2012/0083345 A1 | 4/2012 | Kleinhans et al. |
| 2014/0018178 A1 | 1/2014 | Yoshida et al. |

FOREIGN PATENT DOCUMENTS

| | | |
|---|---|---|
| DE | 19802283 A1 | 3/1999 |
| DE | 102005036789 A1 | 2/2007 |
| FR | 2455210 A1 | 11/1980 |
| GB | 1018530 A | 1/1966 |
| GB | 2141207 A | 12/1984 |
| GB | 2280938 A | 2/1995 |
| GB | 2359121 A | 8/2001 |

* cited by examiner

MULTI-PIECE DRIVESHAFT ASSEMBLY

CROSS-REFERENCE TO RELATED APPLICATION

This application is the National Stage of International Application No. PCT/US2015/029166, filed May 5, 2015, which claims the benefit of U.S. Provisional Application No. 61/988,447, filed May 5, 2014.

BACKGROUND OF THE INVENTION

This invention relates in general to a multi-piece driveshaft assembly. In particular, this invention relates to a coupling shaft assembly for a multi-piece driveshaft assembly.

A driveline assembly is used to transmit rotational power from a source, such as an engine, to a driven component, such as a pair of wheels. In a typical driveline assembly, a driveshaft is included. One type of driveshaft is commonly referred to as a "multi-piece" driveshaft and includes multiple shafts which are connected together and rotatably supported. Typically, the multi-piece driveshaft includes a driveshaft assembly and a coupling shaft assembly. The coupling shaft assemblies known in the art are complex, heavy and expensive to manufacture.

Accordingly, it would be desirable to provide an improved coupling shaft assembly that overcomes the deficiencies of the known designs to provide an improved multi-piece driveshaft assembly.

BRIEF SUMMARY OF THE INVENTION

Embodiments of a multi-piece driveshaft assembly are provided.

In an embodiment, the multi-piece driveshaft assembly includes a driveshaft assembly. The driveshaft assembly comprises a yoke provided at an end thereof. A universal joint is attached to the yoke. A coupling shaft assembly includes a tube yoke and tube. The tube yoke is attached near an end thereof to the universal joint and at or near an opposite end thereof to the tube. A rotational support member is attached to and surrounds a portion of an outer surface of the tube yoke.

In another embodiment, the multi-piece driveshaft assembly comprises a driveshaft assembly. The driveshaft assembly comprises a yoke provided at an end thereof. A cardan type universal joint is attached to the yoke. A coupling shaft assembly comprises a tube yoke and a tube. The tube yoke and the tube are aligned along a longitudinal axis of the coupling shaft assembly. A portion of the tube yoke is substantially U-shaped in cross-section. The tube yoke is attached near an end thereof via a pair of spaced apart lug ears to the cardan type universal joint and at or near an opposite end thereof to the tube by a weld. The tube is of a length and has a substantially constant inner diameter and outer diameter over the length thereof. A rotational support member comprises an inner race. The inner race abuts a shoulder portion of the tube yoke and is directly attached to and surrounds a portion of an outer surface of the tube yoke. The inner race defines an inner diameter. The inner diameter is of a size that is equal to that of the outer diameter of the tube. A support assembly is attached to an outer race of the rotational support member.

DETAILED DESCRIPTION OF THE INVENTION

Figure 1:
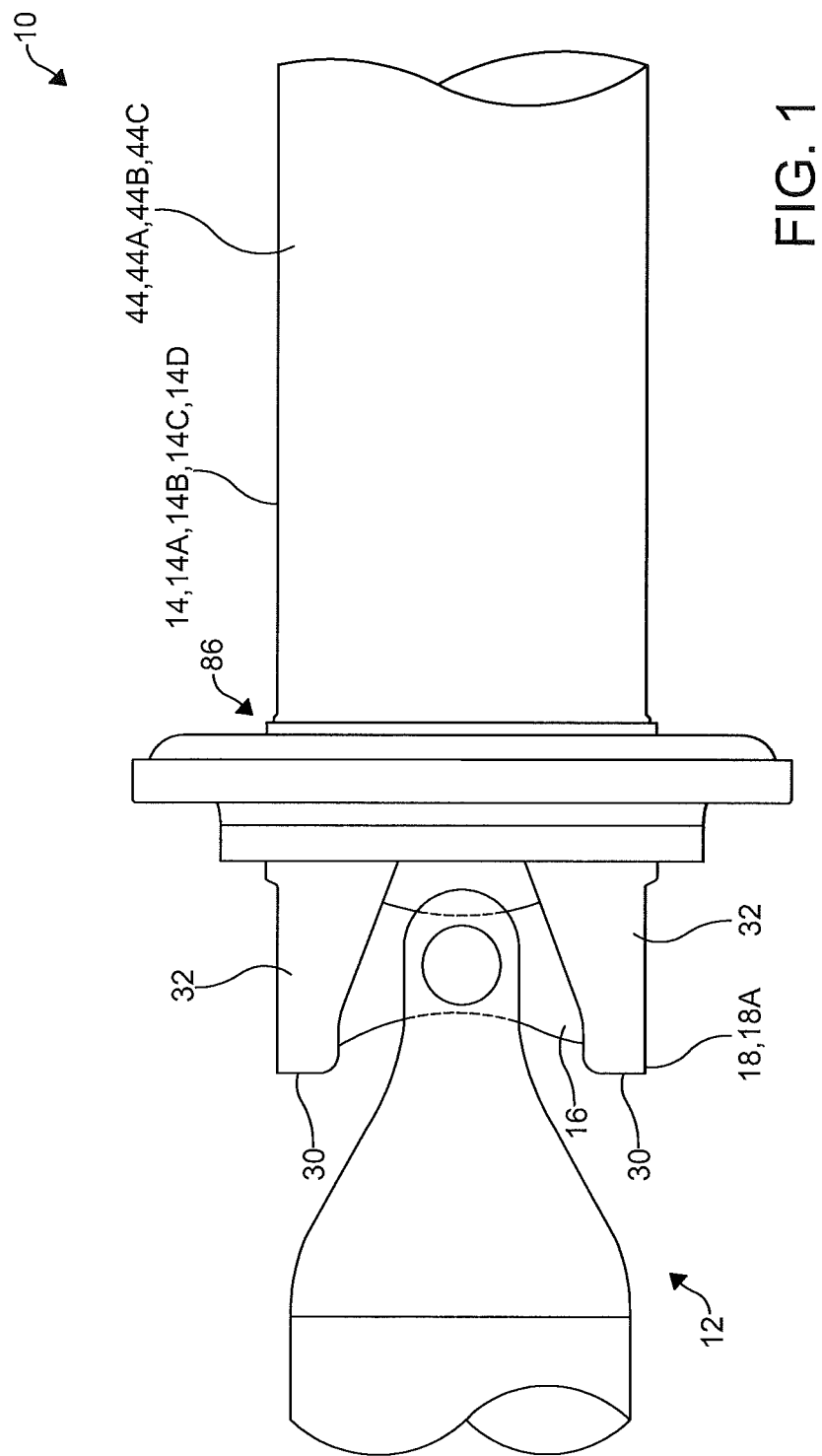
FIG. 1 is a plan view of a portion of a multi-piece driveshaft assembly in accordance with the invention.

It is to be understood that the invention may assume various alternative orientations and step sequences, except where expressly specified to the contrary. It is also to be understood that the specific assemblies and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A multi-piece driveshaft assembly will be described herein. The multi-piece driveshaft assembly will be described in connection with a vehicle (not depicted). The multi-piece driveshaft assembly may have applications to on-highway and off-highway vehicles. However, it should be understood that the multi-piece driveshaft assembly could also have industrial, locomotive, and aerospace applications.

Referring now to the drawings, there is illustrated in FIG. 1 a multi-piece driveshaft assembly 10.

The multi-piece driveshaft assembly 10 comprises a driveshaft assembly 12. The driveshaft assembly 12 comprises a tube and a yoke. The tube is attached to the yoke. The tube may be attached to the yoke utilizing conventional methods of attachment such as, for example, welding or mechanical fasteners. The yoke is provided at an end of the driveshaft assembly 12.

A universal joint 16 is attached to the yoke. The universal joint 16 may comprise a journal cross and bearing cups. Preferably, the universal joint 16 is of the cardan type. Cardan type universal joints known in the art are suitable for use in the multi-piece driveshaft 10.

The multi-piece driveshaft assembly 10 also comprises a coupling shaft assembly 14, 14A, 14B, 14C, 14D operably coupled to the driveshaft assembly 12 via the universal joint 16. In operation, torque supplied by the vehicle's transmission (not depicted) is communicated to the coupling shaft assembly 14, 14A, 14B, 14C, 14D and to the driveshaft assembly 12 via the universal joint 16.

Referring now to FIGS. 1-6, the coupling shaft assembly 14, 14A, 14B, 14C, 14D comprises a tube yoke 18, 18A and a tube 44, 44A, 44B, 44C. Preferably, the tube yoke 18, 18A is formed from a rigid and durable material. A preferred material for use in forming the tube yoke 18, 18A is aluminum. However, the tube yoke 18, 18A may be formed from other rigid durable materials such as steel or high strength cast iron. Preferably, the tube 44, 44A, 44B, 44C is formed from a rigid and durable material such as, for example, a metal or metal alloy. In an embodiment, the tube 44, 44A, 44B, 44C is formed of aluminum. However, the tube 44, 44A, 44B, 44C may be formed of another metal such as steel.

The tube yoke 18, 18A is attached to the universal joint 16 near an end of the tube yoke 18, 18A. The tube yoke 18, 18A comprises a pair of spaced apart lug ears 20. The lug ears 20 are spaced apart from each other by approximately 180 degrees. Each lug ear 20 is attached to a body portion 22, 22A of the tube yoke 18, 18A and extends in a generally axial direction from the body portion 22, 22A. The lug ears 20 define one end of the tube yoke 18, 18A. Preferably, the lug ears 20 are formed in a unitary fashion with the body portion 22, 22A. Each lug ear 20 has a generally cylindrical opening 24 formed therethrough. The cylindrical openings 24 are positioned near the end of the tube yoke 18, 18A defined by the lug ears 20. The openings 24 are coaxial with one another. The universal joint 16 is attached to the coupling shaft assembly 14, 14A, 14B, 14C, 14D via the openings 24.

Each lug ear 20 includes an inner surface 26 and an outer surface 28. The inner surface 26 and the outer surface 28 extend from opposite ends of each opening 24 to the body portion 22, 22A. The inner surfaces 26 face each other and separate the outer surfaces 28 from each other. A pair of side surfaces 30, 32 are provided between the inner surface 26 and the outer surface 28 of each lug ear 20.

The body portion 22, 22A comprises a base 34 and a wall 36, 36A. The base 34 is preferably formed in a unitary manner with the wall 36, 36A such that the body portion 22, 22A is substantially U-shaped in cross-section. A longitudinal axis 38 of the coupling shaft assembly 14, 14A, 14B, 14C, 14D extends through the center of the body portion 22, 22A.

The base 34 has an inboard surface 40 and outboard surface 42. When the tube yoke 18, 18A is attached to a tube 44, 44A, 44B, 44C, the inboard surface 40 is positioned in a substantially perpendicular relationship with the tube 44, 44A, 44B, 44C. The outboard surface 42 is positioned radially in from the inner surfaces 26 of the lug ears 20. A cavity 46 is defined by the base 34 and the wall 36. Providing the tube yoke 18, 18A with the cavity 46 reduces the weight of the coupling shaft assembly 14, 14A, 14B, 14C, 14D.

The wall 36, 36A is generally annular and extends from the base 34 in a generally axial direction therefrom opposite the lug ears 20. A fillet portion 50 connects an inner surface 52 of the wall 36, 36A to the inboard surface 40 of the base 34. The wall 36, 36A comprises a shoulder portion 54, seat portion 56 and tube seat portion 58, 58A.

A ramped transition 60 connects the shoulder portion 54 to the base 34. The shoulder portion 54 extends in an axial direction and is generally annular. The shoulder portion 54 has an outer surface 62. The outer surface 62 defines a diameter. Preferably, the diameter defined by the outer surface 62 is of a size that is substantially constant.

The seat portion 56 is directly attached to the shoulder portion 54. The seat portion 56 has an inner surface 64 and an outer surface 66. The inner surface 64 defines an inner diameter of the seat portion 56. Preferably, the inner diameter is of a size which is substantially constant or gradually changes (increases or decreases) in an axial direction. Additionally, the outer surface 66 defines an outer diameter of the seat portion 56. The outer diameter defined by the outer surface 66 is of a size which may be substantially constant.

The tube seat portion 58, 58A is directly attached to the seat portion 56. The tube seat portion 58, 58A is of a generally cylindrical shape. The tube seat portion 58, 58A has an inner surface 68, 68A, an outer surface 70, 70A and an end surface 72, 72A, which connects the inner surface 68, 68A to the outer surface 70, 70A on ends thereof. Also, the end surface 72, 72A of the tube seat portion 58, 58A defines a second end of the tube yoke 18, 18A which is opposite the end of the tube yoke 18, 18A defined by the lug ears 20. The inner surface 68, 68A defines an inner diameter of the tube seat portion 58, 58A. In an embodiment like the one illustrated in FIG. 3, the inner diameter defined by the inner surface 68A is of a size which may be substantially constant. However, in another embodiment like the one illustrated in FIG. 2, the inner diameter defined by the inner surface 68 may be of a size which increases toward the end surface 72 of the tube seat portion 58. Additionally, the outer surface 70, 70A defines an outer diameter of the tube seat portion 58, 58A. The outer diameter defined by the outer surface 70, 70A is of a size which may be substantially constant.

The tube 44, 44A, 44B, 44C and the tube yoke 18, 18A are aligned along and with the longitudinal axis 38 of the coupling shaft assembly 14, 14A, 14B, 14C, 14D. Preferably, the tube 44, 44A, 44B, 44C is attached to the tube yoke 18, 18A at or near the second end of the tube yoke 18, 18A. More particularly, the tube 44, 44A, 44B, 44C is attached to the tube seat portion 58, 58A of the tube yoke 18, 18A. The tube 44, 44A, 44B, 44C can be attached to the tube seat portion 58, 58A in any number of manners. However, it is preferred that the tube 44, 44A, 44B, 44C is attached to the tube seat portion 58, 58A by a weld 82, 82A. The weld 82, 82A can be formed by any one of a friction, laser, mig (metal inert gas), magnetic pulse or other welding process. In an embodiment like the one shown in FIG. 2, a first end 74 of the tube 44 is attached to the end surface 72 of the tube seat portion 58. In another embodiment like the one shown in FIG. 3, the first end 74 of the tube 44 abuts a discrete transition 76 located between the seat portion 56 and tube seat portion 58A. In this embodiment, an inner surface 78 of the tube 44 surrounds the outer surface 70A and end surface 72A of the tube seat portion 58A.

Figure 4:
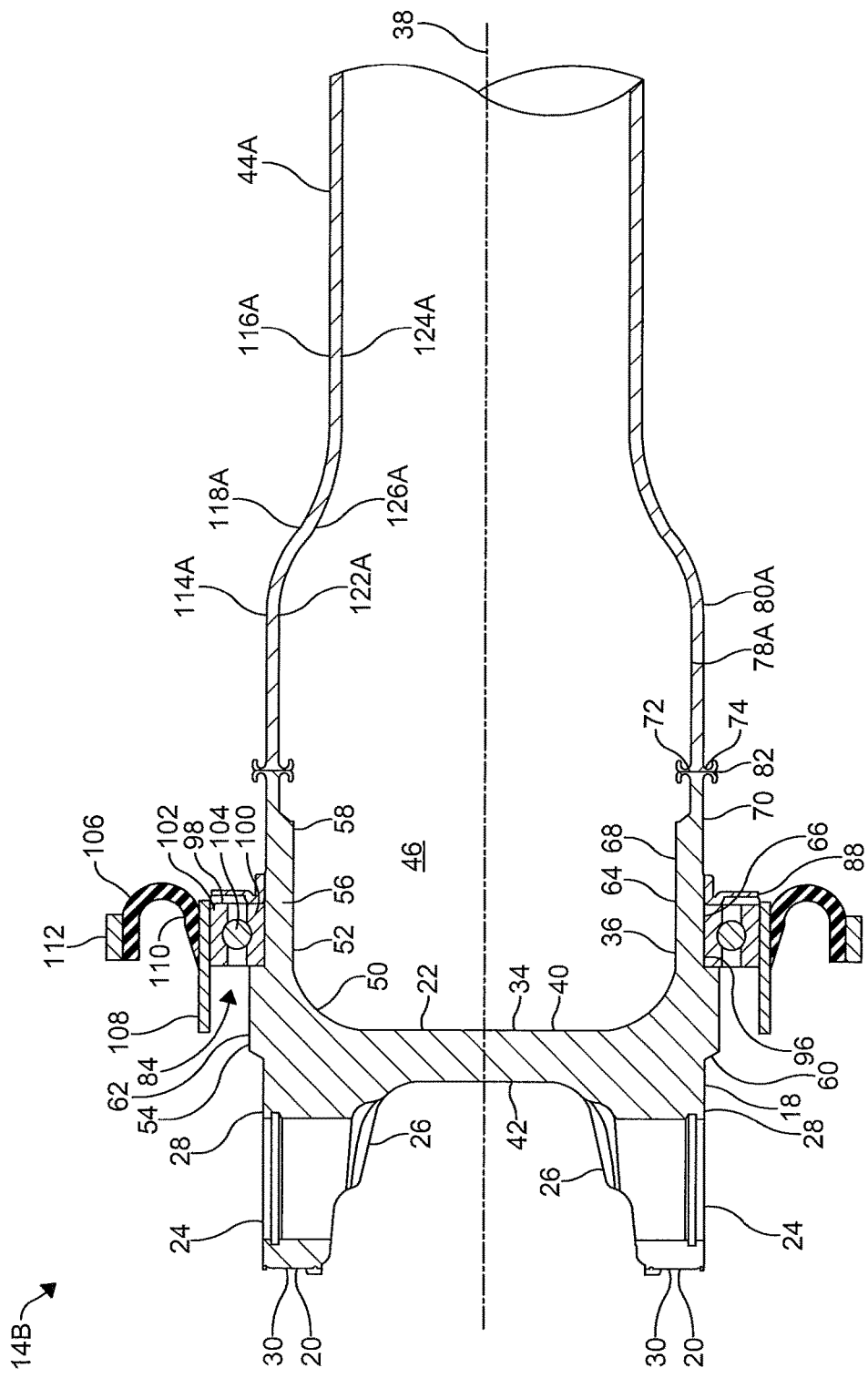
FIG. 4 is a cross-sectional view of another embodiment of a portion of a coupling shaft assembly of the multi-piece driveshaft assembly of FIG. 1.

The tube 44, 44A, 44B, 44C extends from the first end 74 to a second end (not depicted) thereof and is of a length that is defined between the first end 74 and the second end. The length of the tube 44, 44A, 44B, 44C may be predetermined. The tube 44, 44A, 44B, 44C comprises an outer surface 80, 80A, 80B, 80C. In certain embodiments like those illustrated in FIGS. 2-6, the tube 44, 44A, 44B, 44C is a hollow, generally cylindrical member. In these embodiments, the outer surface 80, 80A, 80B, 80C defines an outer diameter of the tube 44, 44A, 44B, 44C. In an embodiment like the one illustrated in FIGS. 2-3, the outer diameter of the tube 44 is substantially constant over the length of the tube 44. In other embodiments like the ones illustrated in FIGS. 4-6, the outer diameter of the tube 44A, 44B, 44C has two or more portions which are of a different size. For example, as illustrated in FIG. 4, the outer diameter may comprise a first diameter portion 114A and a second diameter portion 116A. In this embodiment, the first diameter portion 114A is of a size which is greater than that of the second diameter portion 116A. Also, in this embodiment, a transition portion 118A of the outer diameter may increase in size from the second diameter portion 116A to the first diameter portion 114A. In another embodiment like the one illustrated in FIG. 5, the first diameter portion 114B is of a size which is less than that of the second diameter portion 116B. Also, in this embodiment, the transition portion 118B of the outer diameter may decrease in size from the second diameter portion 116B to the first diameter portion 114B. In yet another embodiment like the one illustrated in FIG. 6, the first diameter portion 114C is of a size which is equal to that of the second diameter portion 116C. In this embodiment, a pair of transition portions 118C of the outer diameter connect a third diameter portion 120C to the first diameter portion 114C and the second diameter portion 116C. The third diameter portion 120C is of a size which is less than that of the first diameter portion 114C and the second diameter portion 116C.

Figure 2:
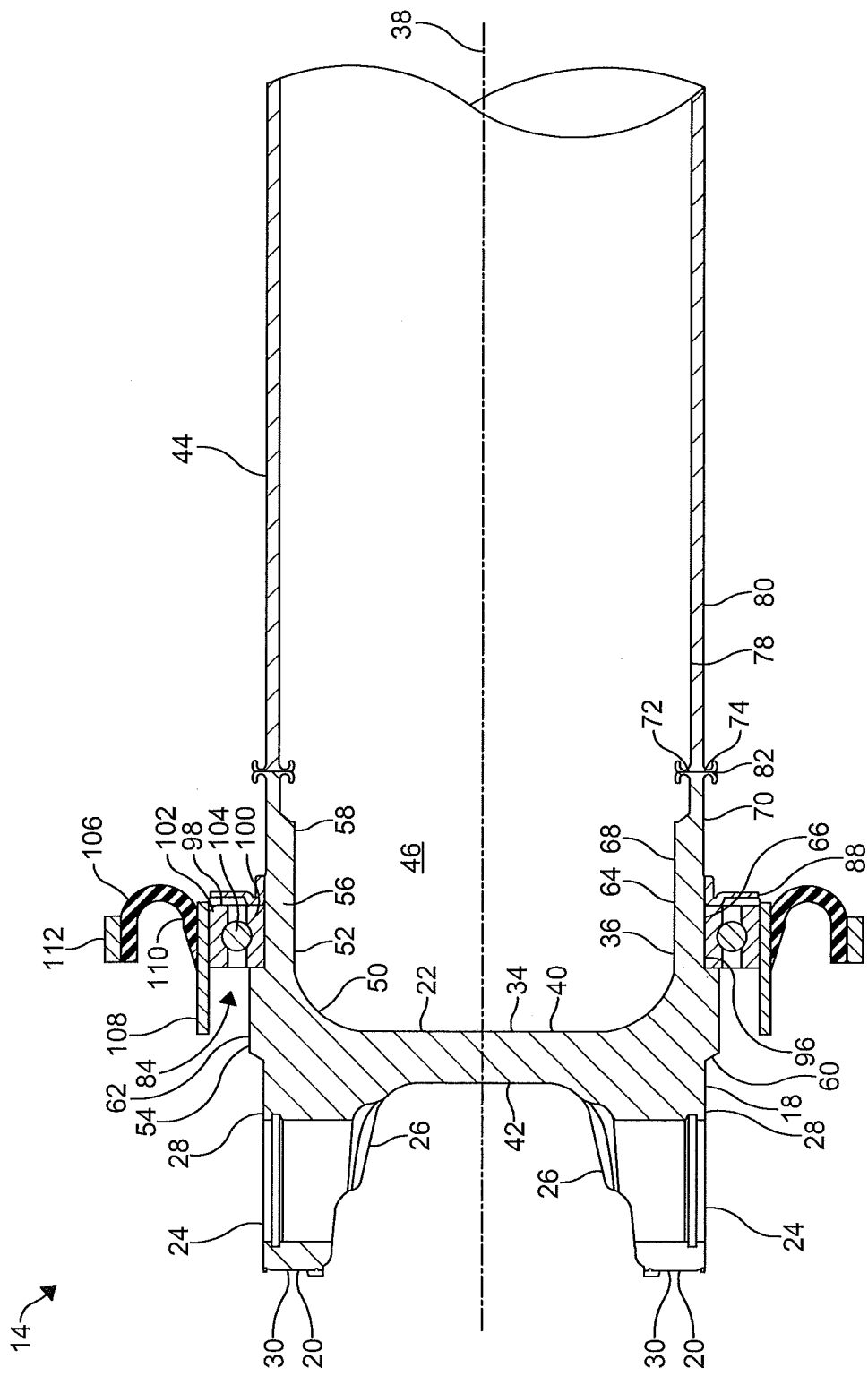
FIG. 2 is a cross-sectional view of an embodiment of a portion of a coupling shaft assembly of the multi-piece driveshaft assembly of FIG. 1.
Figure 3:
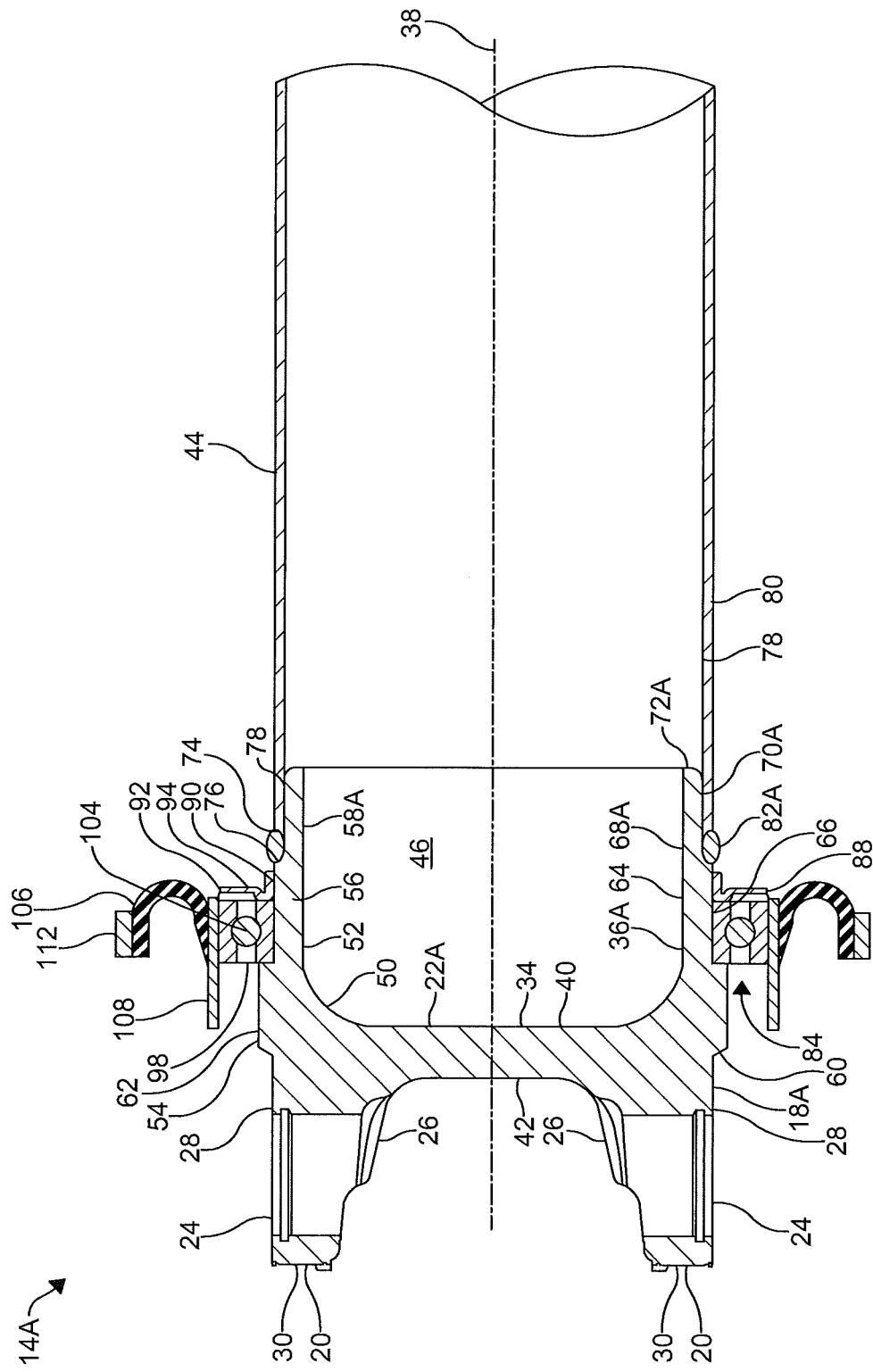
FIG. 3 is a cross-sectional view of another embodiment of a portion of a coupling shaft assembly of the multi-piece driveshaft assembly of FIG. 1.
Figure 5:
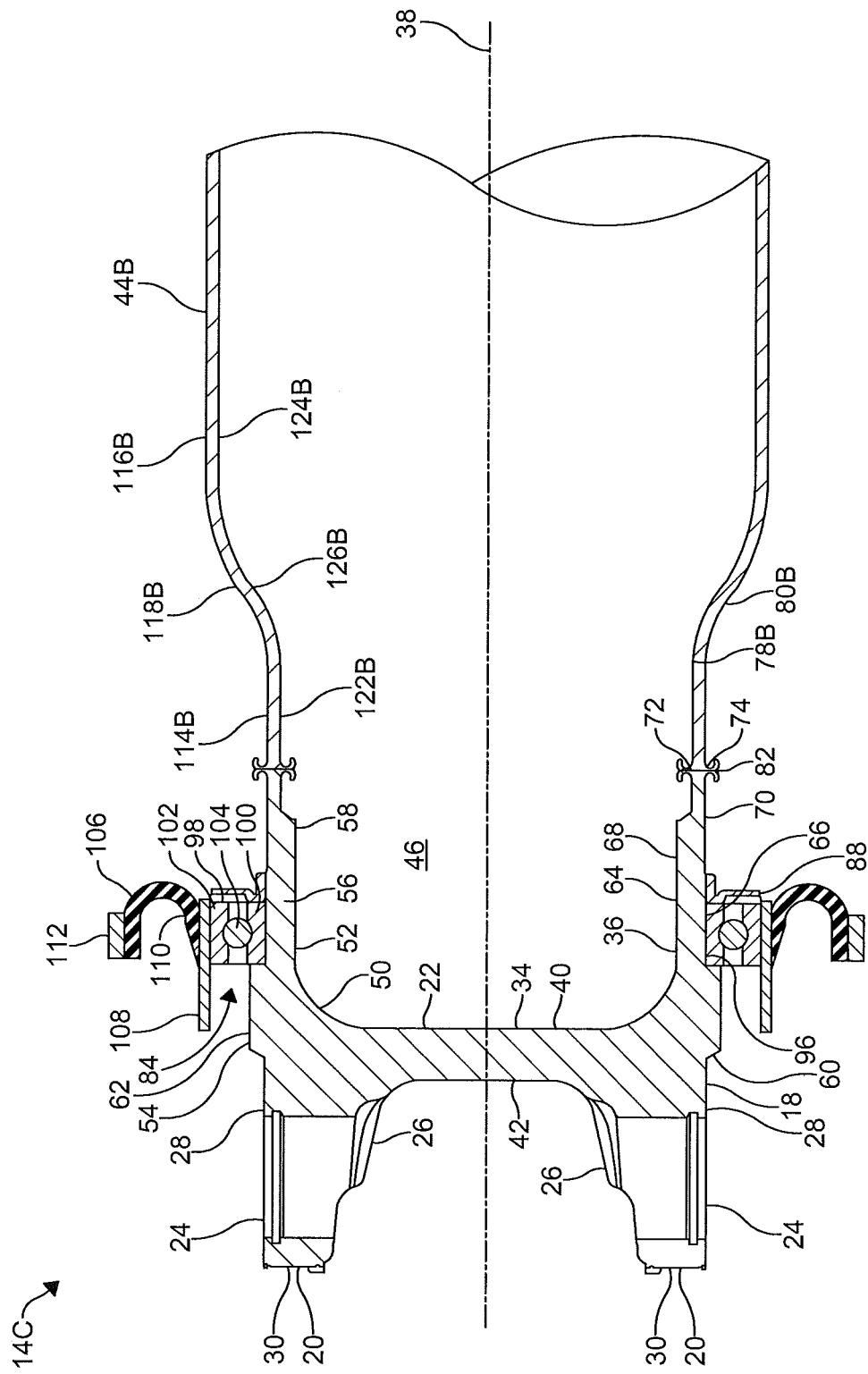
FIG. 5 is a cross-sectional view of another embodiment of a portion of a coupling shaft assembly of the multi-piece driveshaft assembly of FIG. 1.
Figure 6:
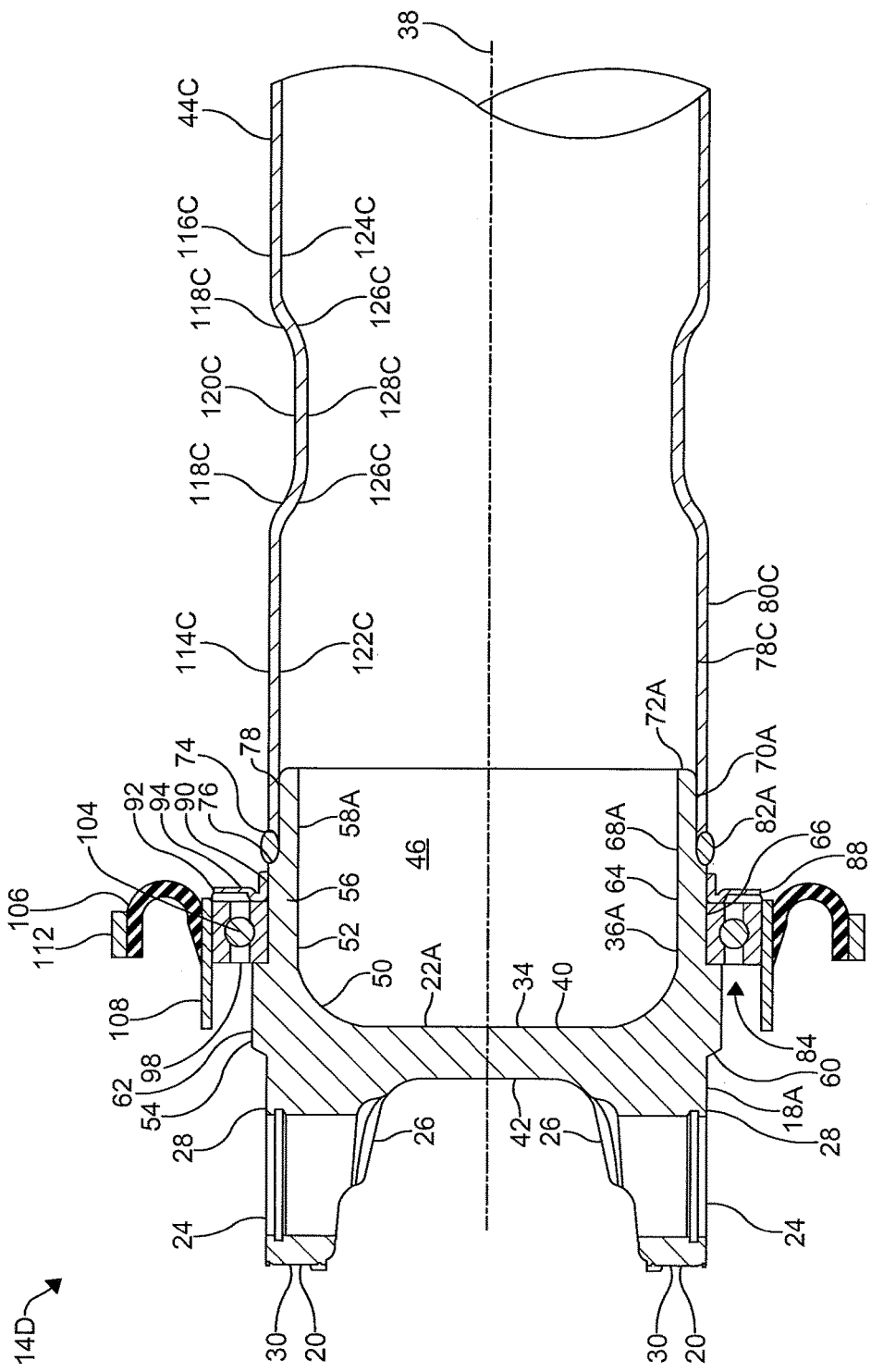
FIG. 6 is a cross-sectional view of another embodiment of a portion of a coupling shaft assembly of the multi-piece driveshaft assembly of FIG. 1.

In certain embodiments like the ones illustrated in FIGS. 2 and 4-5, the outer surface 80, 80A, 80B of the tube 44, 44A, 44B is aligned with the outer surface 70 of the tube seat portion 58. In these embodiments, at least a portion of the outer diameter defined by the outer surface 80, 80A, 80B of the tube 44, 44A, 44B is of a size which is equal to that of the outer diameter defined by the outer surface 70 of the tube seat portion 58. It should be appreciated that when describing the similarity of two diameters of the multi-piece driveshaft 10, the term "equal to" may mean that the diameters being referenced are exactly the same size or are substantially equal in size to one another. In other embodiments like the ones illustrated in FIGS. 3 and 6, the outer surface 80, 80C of the tube 44, 44C is aligned with the outer surface 66 of the seat portion 56. In this embodiment, the outer diameter defined by the outer surface 80, 80C of the tube 44, 44C is of a size which is equal to that of the outer diameter defined by the outer surface 66 of the seat portion 56.

In certain embodiments like those illustrated in FIGS. 2-6, the inner surface 78, 78A, 78B, 78C of the tube 44, 44A, 44B, 44C defines an inner diameter of the tube 44, 44A, 44B, 44C. In embodiments like the ones illustrated in FIGS. 2-3, the inner diameter of the tube 44 is substantially constant over the length of the tube 44. In other embodiments like the ones illustrated in FIGS. 4-6, the inner diameter of the tube 44A, 44B, 44C has two or more portions which are of a different size. For example, as illustrated in FIG. 4, the inner diameter may comprise a first diameter portion 122A and a second diameter portion 124A. In this embodiment, the first diameter portion 122A is of a size which is greater than that of the second diameter portion 124A. Also, in this embodiment, a transition portion 126A of the inner diameter may increase in size from the second diameter portion 124A to the first diameter portion 122A. In another embodiment like the one illustrated in FIG. 5, the first diameter portion 122B is of a size which is less than that of the second diameter portion 124B. Also, in this embodiment, the transition portion 126B of the inner diameter may decrease in size from the second diameter portion 124B to the first diameter portion 122B. In yet another embodiment like the one illustrated in FIG. 6, the first diameter portion 122C is of a size which is equal to that of the second diameter portion 124C. In this embodiment, a pair of transition portions 126C of the inner diameter connect a third diameter portion 128C to the first diameter portion 122C and the second diameter portion 124C. The third diameter portion 128C is of a size which is less than that of the first diameter portion 122C and the second diameter portion 124C.

At or near its second end, the tube 44, 44A, 44B, 44C may be coupled to another yoke (not depicted) or another shaft assembly (not depicted).

The coupling shaft assembly 14, 14A, 14B, 14C, 14D also comprises a rotational support member 84. The rotational support member 84 provides support for the rotation of the coupling shaft assembly 14, 14A, 14B, 14C, 14D and the multi-piece driveshaft assembly 10. The rotational support member 84 is located in a center portion 86 of the multi-piece driveshaft assembly 10. More particularly, the rotational support member 84 is positioned on the multi-piece driveshaft assembly 10 between the tube 44, 44A, 44B, 44C and the universal joint 16 and is directly attached to the tube yoke 18, 18A. One or more additional rotational support members (not depicted) may also be provided in the center portion of the multi-piece driveshaft assembly to provide additional rotational support thereto.

The rotational support member 84 is attached to and surrounds a portion of the outer surface of the tube yoke 18, 18A. Preferably, the rotational support member 84 abuts the shoulder portion 54. More preferably, the rotational support member 84 abuts the shoulder portion 54 and is directly attached to the outer surface 66 of the seat portion 56. The rotational support member 84 can be attached to the outer surface 66 via one or more of an interference type fit, a retainer 88 or staking. A preferable interference type fit is a press fit. However, it should be appreciated that additional types of interference fits may be utilized to attach the rotational support member 84 to the seat portion 56. A preferable type of retainer 88 is a slinger. In certain embodiments like those shown in FIGS. 2 and 3, the slinger is an annular member having a minor diameter portion 90, which is provided around the outer surface 66 of the seat portion 56, and a major diameter portion 92, which extends radially out from the minor diameter portion 90. A curved transition portion 94 connects the minor diameter portion 90 to the major diameter portion 92 and abuts the rotational support member 84. However, additional types of retainers such as, for example, a snap ring (not depicted) may be utilized to attach the rotational support member to the outer surface. In embodiments (not depicted) where a snap ring is utilized as the retainer, an annular groove is provided in the outer surface of the seat portion for engaging the snap ring. Alternatively, another type of retainer may be used to secure the rotational support member to the outer surface of the seat portion. Staking processes known in the art are suitable for attaching the rotational support member to the seat portion.

Preferably, the rotational support member 84 has an axis of rotation which is aligned with the longitudinal axis 38 of the coupling shaft assembly 14, 14A, 14B, 14C, 14D. The rotational support member 84 has an aperture 96 which defines an inner diameter thereof. The inner diameter defined by the aperture 96 is of a size which is greater than that of the inner diameter defined by the inner surface 64 of the seat portion 56. In certain embodiments, the inner diameter defined by the aperture 96 is of a size which is greater than or equal to that of the outer diameter defined by the outer surface 80, 80A, 80B, 80C of the tube 44, 44A, 44B, 44C. In an embodiment, the size of the inner diameter defined by the aperture 96 is equal to that of the outer diameter defined by the outer surface 70 of the tube seat portion 58. In yet another embodiment, the size of the inner diameter defined by the aperture 96 is equal to the outer diameter defined by the outer surface 66 of the seat portion 56.

In an embodiment (not depicted), the rotational support member is a bushing. Referring now to FIG. 2, in another embodiment, the rotational support member 84 is a bearing 98. However, the rotational support member is not limited to being one of the above as other members which provide support for the rotation of the coupling shaft assembly 14, 14A, 14B, 14C, 14D and the multi-piece driveshaft assembly 10 may be utilized in practicing the invention.

Preferably, the bearing 98 is a sealed, pre-lubricated assembly. The bearing 98 comprises an inner race 100, an outer race 102 and a plurality of balls 104. The balls 104 are provided between the inner race 100 and the outer race 102 to allow the inner race 100 to rotate with respect to the outer race 102. The inner race 100 is provided such that it surrounds a portion of and is directly attached to the outer surface 66 of the seat portion 56. In an embodiment, the inner race 100 is positioned between the shoulder portion 54 of the tube yoke 18, 18A and the retainer 88. Preferably, the inner race abuts the shoulder portion 54. Also, in these embodiments, the inner race 100 defines the aperture 96. The inner race 100 is preferably press-fit onto the outer surface 66 of the seat portion 56. Thus, prior to forming the multi-piece driveshaft assembly 10, the diameter defined by the aperture 96 may be of a size that is slightly less than that of the diameter defined by the outer surface 66 of the seat portion 56. The inner race 100 defines an inner diameter. The inner diameter is of a size that is equal to that of the outer diameter of at least a portion of the tube 44 et al.

The rotational support member 84 is attached to a support assembly 106. When the rotational support member is a bearing, the outer race 102 thereof is attached to the support assembly 106. The outer race 102 is attached to and may be press-fit into an inner portion 108 of the support assembly 106.

The support assembly 106 comprises an isolator 110 which is attached to and separates the inner portion 108 from an outer portion 112 of the support assembly 106. The inner portion 108 is an annular member and may be formed from a metal, metal alloy, plastic or other materials. The isolator 110 is preferably made from a flexible material such as, for example, rubber or the like. In certain embodiments, the isolator 110 may be formed from an elastomeric material. The outer portion 112 may be formed from a metal, metal alloy, plastic or other materials and is attached to the vehicle body (not depicted). Preferably, the outer portion 112 is an annular member. However, it should be appreciated that the outer portion 112 may not be annular and may be of another shape.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A multi-piece driveshaft assembly, comprising:
a driveshaft assembly which comprises a yoke provided at an end thereof;
a universal joint is attached to the yoke;
a coupling shaft assembly comprises a tube yoke and a tube, wherein the tube yoke comprises a pair of spaced apart lug ears, each ear defining coaxial openings wherein the ears are separated by a body portion with which each lug ear is unitarily formed, said body portion comprises a unitary base with a U-shaped cross section and an annular wall axially extending from the base opposite said ears, wherein said wall comprises a tube seat portion, wherein said tube is directly attached to the tube seat portion by a weld; and
a rotational support member is attached directly to and surrounds a portion of an outer surface of the tube yoke, said rotational support member attached to said tube yoke between the tube and the universal joint;
wherein the rotational support member is a bearing which comprises an inner race, an outer race and a plurality of balls provided between the inner race and the outer race;
wherein the inner race is directly attached to a seat portion and abuts a shoulder portion of the tube yoke.

2. The multi-piece driveshaft assembly of claim 1, further comprising a support assembly which is attached to the rotational support member.

3. The multi-piece driveshaft assembly of claim 2, wherein the support assembly comprises an isolator which is attached to an inner annular member and an outer member.

4. The multi-piece driveshaft assembly of claim 3, wherein the inner annular member is attached to an outer race of the rotational support member and the outer member is attached to a vehicle body.

5. The multi-piece driveshaft assembly of claim 1, wherein the universal joint is of the cardan type.

6. The multi-piece driveshaft assembly of claim 5, the tube yoke being attached to the cardan type universal joint via a pair of spaced apart lug ears.

7. The multi-piece driveshaft assembly of claim 1, wherein the tube comprises an outer diameter that is substantially constant and an inner diameter that is substantially constant.

8. The multi-piece driveshaft assembly of claim 1, wherein the tube comprises an outer diameter that has two or more portions which are of a different size and an inner diameter has two or more portions which are of a different size.

9. The multi-piece driveshaft assembly of claim 1, wherein the rotational support member is positioned on the multi-piece driveshaft assembly axially between the tube and the universal joint.

10. The multi-piece driveshaft assembly of claim 1, wherein the portion of the outer surface of the tube yoke surrounded by the rotational support member comprises a substantially constant diameter.

11. The multi-piece driveshaft assembly of claim 1, wherein the rotational support member comprises an inner diameter and the tube comprises an outer diameter, and the inner diameter of the rotational support member is of a size with is equal to a size of the outer diameter of the tube.

12. The multi-piece driveshaft assembly of claim 1, wherein the tube yoke comprises an outer surface which is equal in diameter to that of an outer surface of the tube.

13. The multi-piece driveshaft assembly of claim 1, wherein the rotational support member is located in a center portion of the multi-piece driveshaft assembly.

14. The multi-piece driveshaft assembly of claim 1, wherein the inner race is positioned between the shoulder portion and an annular retainer attached to the outer surface of the tube yoke.

15. A multi-piece driveshaft assembly, comprising:
a driveshaft assembly which comprises a yoke provided at an end thereof;
a cardan type universal joint is attached to the yoke;
a coupling shaft assembly comprises a tube yoke and a tube, which are aligned along a longitudinal axis of the coupling shaft assembly, a portion of the tube yoke is substantially U-shaped in cross-section and the tube yoke is attached near an end thereof via a pair of spaced apart lug ears to the cardan type universal joint and at or near an opposite end thereof to the tube by a weld, the tube is of a length and has a substantially constant inner diameter and outer diameter over the length thereof;

a rotational support member comprises an inner race, the inner race abuts a shoulder portion of the tube yoke and is directly attached to and surrounds a portion of an outer surface of the tube yoke, the inner race defines an inner diameter and the inner diameter is of a size that is equal to that of the outer diameter of the tube; and a support assembly is attached to an outer race of the rotational support member.

16. The multi-piece driveshaft assembly of claim 15, wherein the support assembly comprises an isolator which is attached to an inner annular member and an outer member, and the inner annular member is attached to an outer race of the rotational support member and the outer member is attached to a vehicle body.

* * * * *